N. HARLAN, Dec'd.

W. D. HARLAN, Executor, KOCH SONS & CO., Assignees.

BOOK CLASP.

No. 10,262. Reissued Dec. 19, 1882.

Witnesses.
Harold Serrell
Chas H. Smith

Koch, Sons and Company
assignees of Newton Harlan
per Inventor
Lemuel W. Serrell
atty.

N. PETERS, Photo-Lithographer, Washington, D. C.

UNITED STATES PATENT OFFICE.

KOCH SONS & CO., OF NEW YORK, N. Y., ASSIGNEES OF WOODFORD D. HARLAN, EXECUTOR OF NEWTON HARLAN, DECEASED.

BOOK-CLASP.

SPECIFICATION forming part of Reissued Letters Patent No. 10,262, dated December 19, 1882.

Original No. 164,646, dated June 22, 1875. Application for reissue filed December 30, 1881.

*To all whom it may concern:*

Be it known that NEWTON HARLAN, deceased, formerly of Washington, in the District of Columbia, did invent an Improvement in Book-Clasps, of which the following is a specification.

Book-clasps have been provided with locks prior to the present invention, and such clasps have been hinged to one cover of the book and connected with the other cover by a projection on one part catching and holding the other part.

This invention relates to an improved clasp that is variable in length, so as to adapt the same clasp to books of different thicknesses, and a lock is provided, so as to secure the book and render the contents accessible only to the person having a key.

Figure 1:
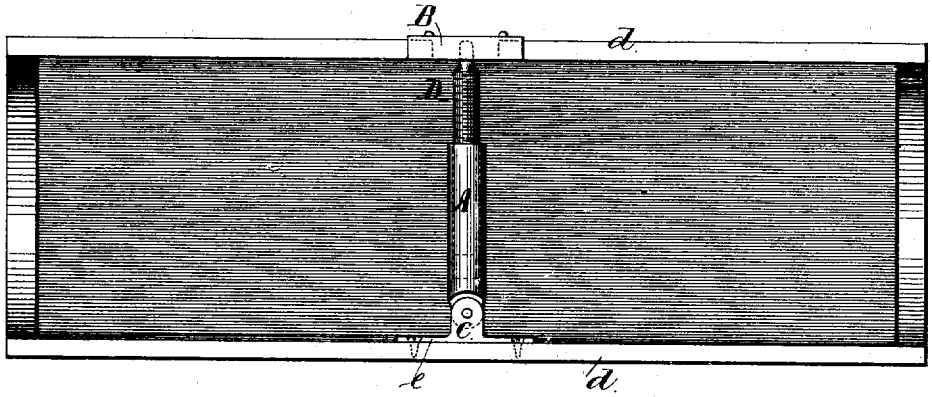
Figure 2:
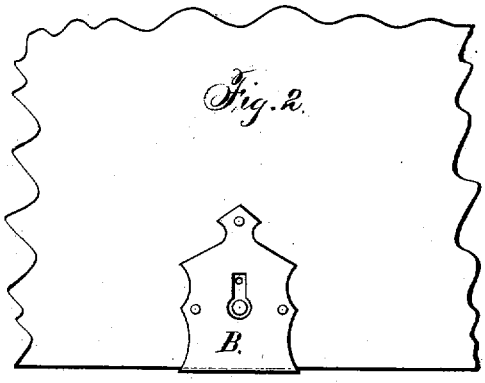
Figure 3:
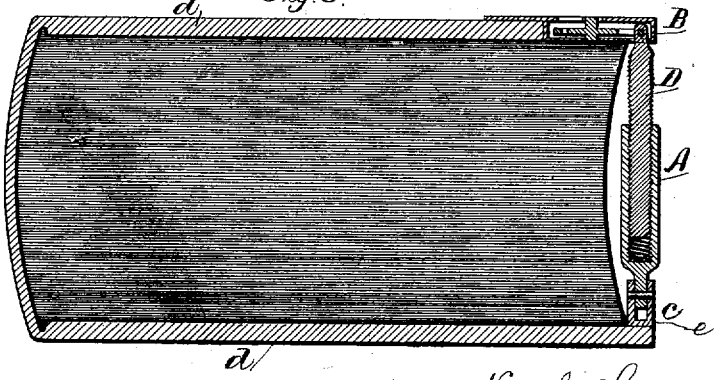

In the drawings, Figure 1 is an elevation of a book with the fastening or clasp. Fig. 2 represents the lock and part of the book-cover, and Fig. 3 is a section of the book and clasp.

The book or album is of any desired size or character. The clasp is made with the two parts A and D, the part D being a screw-stem entering the screw-socket A, and at one end is a hinge, C, and its plate *e*, to connect the clasp to one cover, *d*, of the book, and at the other end the clasp is removably connected with the other cover. The screw-stem allows the clasp to be extended or contracted to suit different thicknesses of books.

The lock B may be an ordinary spring-lock capable of being operated by a key. This lock is attached to one of the covers, and it is adapted to secure the end of the clasp D which enters into such lock. A hole is represented in the end of D for the lock-bolt to enter.

The hinge *c* is shown as made with a pivot at right angles to the edge of the book, so that the hasp can be swung in a plane parallel to the edge of the book and laid down against the inner side of one of the covers, where it will be less liable to be injured or broken than the ordinary clasp.

What is claimed as the invention of NEWTON HARLAN, deceased, is—

1. The combination, in a book-clasp, of a hinge attached to one of the covers, and a hasp containing a screw-stem and screw socket or sleeve, whereby the length of the clasp can be varied, and an attaching device for the moving end of the clasp, substantially as set forth.

2. In a book-clasp, the combination of the screw D and its screw-threaded sleeve or socket, whereby the clasp is made adjustable by the screw to suit books of different thicknesses, substantially as set forth.

3. In a book-clasp, the combination, with the swinging hasp, of a hinge the pin of which is at right angles, or nearly so, to the front of the book, so that said hasp may be turned down against the inner edge of the cover, substantially as set forth.

4. In combination with the extensible hasp, the locking device for receiving and holding the moving end of the hasp, substantially as set forth.

Signed this 21st day of December, A. D. 1881.

KOCH SONS & CO.,
By W. C. HORN.

Witnesses:
GEO. T. PINCKNEY,
HAROLD SERRELL.